May 30, 1950 W. F. FAGEN 2,509,425

IRON CORE VARIOMETER

Filed Oct. 29, 1946 2 Sheets-Sheet 1

INVENTOR
William F. Fagen
BY
Nicholas Lange
ATTORNEY

IRON CORE VARIOMETER

Filed Oct. 29, 1946 2 Sheets-Sheet 2

INVENTOR
William F. Fagen
BY Nichola Lang Jr.
ATTORNEY

Patented May 30, 1950

2,509,425

UNITED STATES PATENT OFFICE 2,509,425

IRON CORE VARIOMETER

William F. Fagen, Ormond Beach, Fla., assignor to P. R. Mallory & Co., Inc., Indianapolis, Ind., a corporation of Delaware Application October 29, 1946, Serial No. 706,298

4 Claims. (Cl. 171—242)

Figures 1, 2, 3, 4, 5:
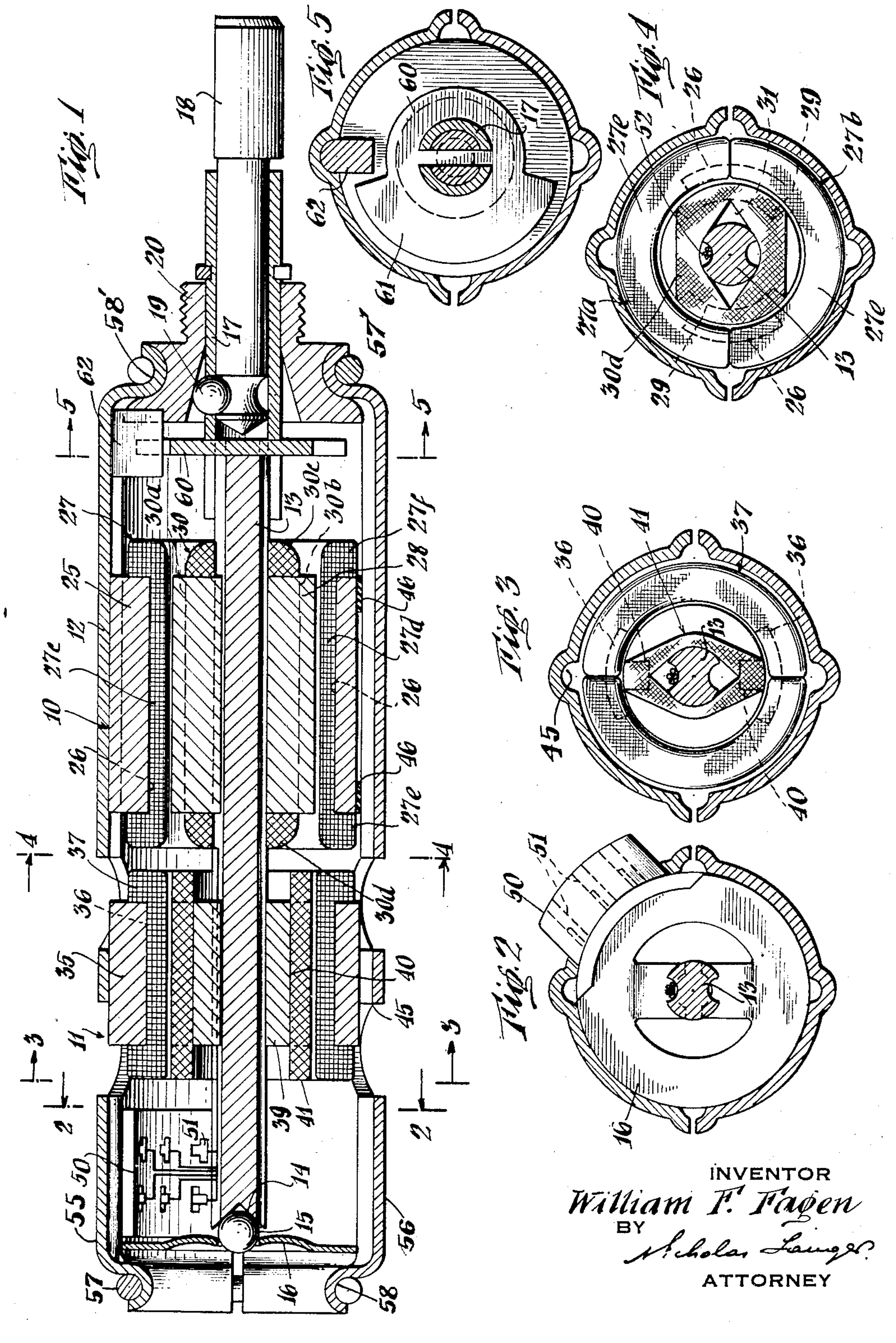

This invention relates to iron core variometers and, more particularly, to a uni-control ganged iron core variometer for tuning a superheterodyne radio circuit. This invention further relates to a superheterodyne circuit utilizing such a uni-control variometer.

In a superheterodyne radio circuit, the antenna circuit and the radio frequency amplifier circuits are tuned to the frequency of the signal to be received. The amplified signal is then heterodyned or mixed with the output of an oscillator circuit, the frequency of which differs from the signal frequency by a predetermined amount. In this manner, a beat or intermediate frequency signal is produced which is amplified and passed through a detector tube to thereby produce an audio-frequency signal. The audio-frequency signal is usually further amplified in order to provide sufficient power for energization of a loud speaker or other reproducing device.

In order to operate satisfactorily, the resonant frequency, hereinafter termed the frequency, of the oscillator circuit must differ from the signal frequency by a constant amount throughout the entire tuning range of the receiver. If the oscillator frequency is maintained at a higher value than the signal frequency, as is commonly the case, the frequency variation of the oscillatory circuit is considerably less than that of the antenna circuit and radio frequency amplifier circuits. For example, for a conventional broadcast receiver, the antenna and radio frequency circuits may be tuned through a frequency range of 540 to 1610 kilocycles—a frequency ratio of approximately 3 to 1—while the oscillator section may have a frequency range of approximately 995 to 2065 kilocycles—a frequency ratio of approximately 2 to 1. Since the frequency of a tuned circuit varies inversely with the square root of the inductance, it will be apparent that the antenna circuit will have an inductance variation of approximately 9 to 1 whereas the antenna and radio circuits will require an inductance variation of only 4 to 1.

It will be apparent that this characteristic of superheterodyne circuits results in considerable difficulty being experienced in maintaining the correct frequency difference between the oscillator and antenna circuits throughout the entire tuning range.

In accordance with the invention, it has been found that the desired critical regulation of the various tuning circuits may be accomplished by using a ganged iron core variometer, each unit of which consists of relatively movable rotor and stator coils wound upon a core of pressed powdered paramagnetic material. The inductance of such a variometer unit is equal to the inductance of the rotor winding plus the inductance of the stator winding plus or minus twice the mutual inductance between the windings. It will be apparent that the value of the mutual inductance determines the range of inductance variation for the variometer since the inductance of the rotor and stator coils is substantially constant. It has been found that the value of the mutual inductance may be conveniently and effectively controlled by varying the shape of the rotor cores and stator cores to provide a change of frequency in each unit at the required ratio to cover the frequency range desired and to effect satisfactory frequency conversion. That is to say, the rotor and stator cores may be readily designed to provide a substantially constant frequency difference between the two tuning units of the variometer.

However, unavoidable inaccuracies in factory manufacture together with the absolute and incremental distributed capacities between the cores and the windings thereon necessitate additional adjustment in order to prevent excessive mistracking of the oscillator and antenna circuits. In accordance with the invention, this adjustment may be made in factory production by varying the axial position of each stator core with respect to the associated rotor core. After the variometer has been adjusted in this manner, the stator core is sealed in position with a suitable substance, such as plastic cement, and the variometer is thus permanently maintained with the desired inductance ratios. If further adjustment is required after the variometer has been connected in a superheterodyne circuit, such adjustment may be affected by utilizing adjustable condensers in shunt or series with the respective variometer units in the radio tuning circuits. It will be apparent, therefore, that a small axial adjustment of the relative position of the rotor and stator cores is all that is required to compensate for manufacturing variations with the novel iron core variometer.

Although the characteristics of the novel control variometer are suitable for use in superheterodyne radio receivers, the inherent advantages resulting from the use of the iron cores and the provision of axial adjustment between the rotor and stator cores make the use of the novel variometer desirable in other types of tuning circuits.

It is an object of the invention to improve the construction and operation of variometer tuning units, and particularly of iron core variometer tuning units.

It is a further object of the invention to provide an improved superheterodyne circuit for radio receivers.

It is a still further object of the invention to provide a variometer in which adjustment of the tuning units is reduced to a minimum.

It is a still further object of the invention to provide a variometer which is of simple, economical construction and can be easily manufactured on a commercial scale.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

Figure 6:
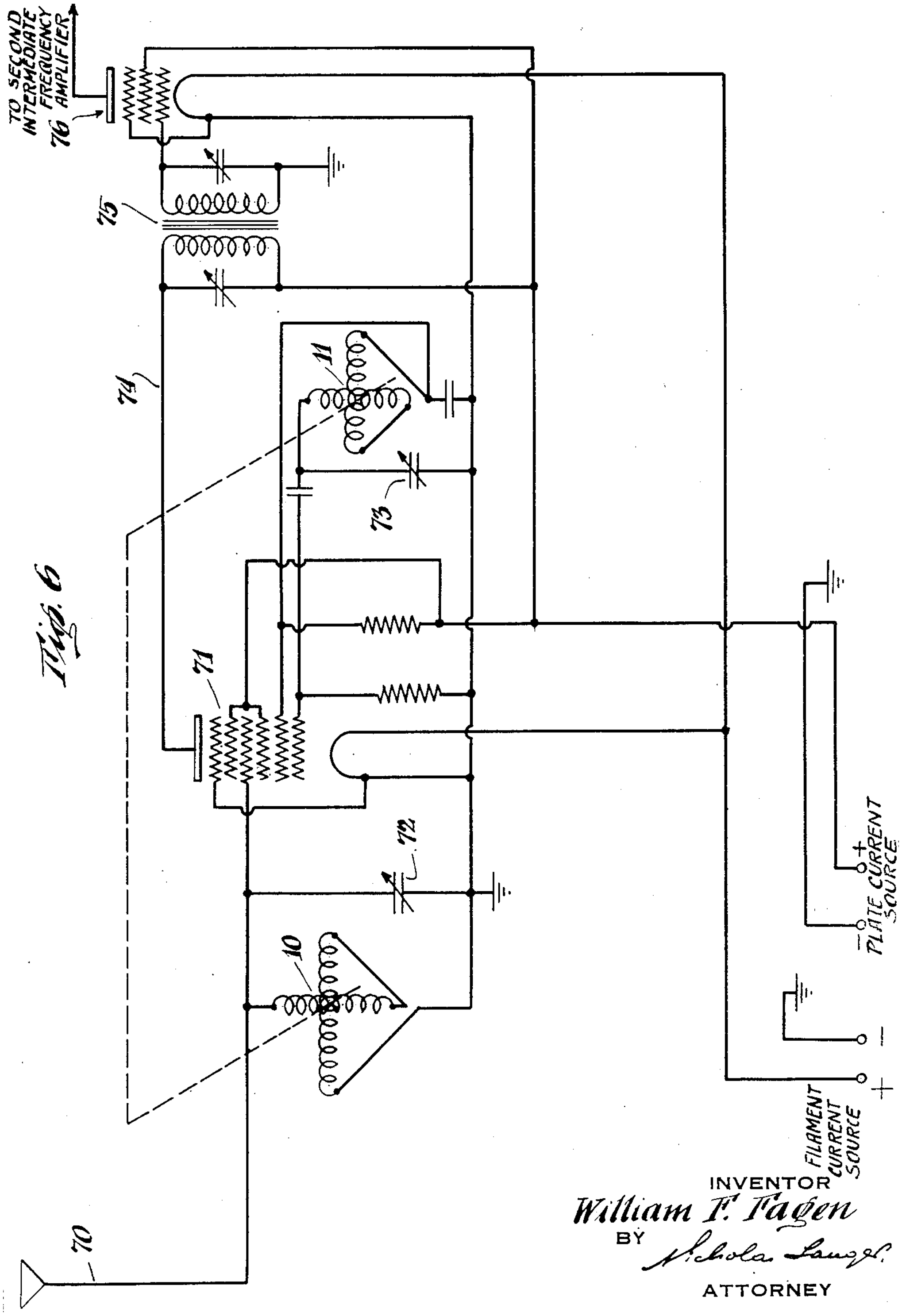

For a fuller understanding of the nature and objects of the invention as well as for specific fulfillment thereof, reference should be had to the following detailed description taken in connection with the accompanying drawings, in which:

Figure 1 is a vertical, sectional view of the novel iron core variometer;

Figures 2, 3, 4 and 5 are, respectively, sectional views taken along the lines 2—2, 3—3, 4—4 and 5—5 of Figure 1; and Figure 6 is a schematic circuit diagram of a superheterodyne receiver circuit utilizing the novel iron core variometer in its tuning circuits.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawings in detail, and particularly to Figures 1 to 5, the novel iron core variometer comprises an antenna tuning unit 10 and an oscillator tuning unit 11 which are mounted within a metallic casing 12 formed preferably of aluminum and which, in the example shown, consists of two half shells 55 and 56 joined together in any suitable manner such as by annular springs 57, 57′ in grooves 58, 58′ of the final casing 12. A shaft 13 is journaled in the casing 12 and, for this purpose, one end of the shaft is recessed as at 14 for engagement with a ball 15 which, in turn, engages an annular resilient plate member 16 suitably mounted in the casing 12. The other end of the shaft carries a bushing 17 into which a control rod 18 is inserted, as by press fitting, and the rod 18 is provided with bearings 19 journaled in an insulating block 20 which is suitably secured to an adjacent end of the casing 12.

The antenna tuning unit 10 comprises a cylindrical stator core 25 of pressed powdered paramagnetic material and this core has a pair of diametrically opposite longitudinal slots 26 in which is wound an antenna stator coil 27. It will be observed that the coil 27 consists of two sections 27*a* and 27*b*, Figures 1 and 4, each section comprising central portions 27*c*, 27*d* which are wound in the respective slots 26 together with generally semicircular end portions 27*e*, 27*f* which may be suitably secured to the respective ends of the stator core 25, for example, by varnish or cement. As the two sections are preferably connected in series, they may conveniently be formed upon a coil winding machine from a single piece of wire after which they are inserted in proper position upon the core and then cemented or otherwise secured in position thereon.

The antenna tuning unit further comprises a rotor core 28 which is secured on the shaft 13 and which is formed from pressed powdered paramagnetic material. The rotor core is provided with diametrically opposite longitudinal slots 29 within which is wound a rotor coil 30 consisting of central portions 30*a*, 30*b* disposed within the respective slots 29 together with end portions 30*c*, 30*d* cemented or otherwise suitably secured to the respective ends of the rotor core. The end portions of the rotor coil are suitably shaped to leave an aperture 31 for receiving the control shaft 13. It will be apparent that the stator coil and rotor coil are in closely coupled relation when they are in the position shown by Figures 4 and 5 wherein the central portions of the rotor coil are in their closest position to the central portions of the stator coil. It will further be apparent that the coupling between the coils and, hence, the mutual inductance may be readily varied by rotation of the control shaft. The pressed powdered paramagnetic cores increase the efficiency of the tuning unit and provide a considerably greater range of inductance variation for the tuning coils than in conventional tuning devices. The use of the iron cores also results in a smaller tuning unit, this being advantageous in reducing the size of the set with which the tuner is associated.

The oscillator tuning unit 11 is constructed in generally the same manner as the antenna tuning unit 10 except that the cores are somewhat shorter and the windings, accordingly, have a considerably smaller inductance value. The unit 11 comprises a stator core 35 of pressed powdered paramagnetic material having a pair of diametrically opposite longitudinally extending slots 36 in which is wound an oscillator stator coil 37 in the manner described in connection with the stator coil 27. An oscillator rotor core 39 is fixed on the control shaft 13 and has diametrically opposite longitudinal slots 40 in which is wound an oscillator rotor coil 41 in the manner described in connection with the rotor coil 30. The slots on the respective stator and rotor cores are aligned so that both sections of the tuning unit simultaneously reach their positions of maximum and minimum inductance. In the oscillator tuning unit, the paramagnetic core also serves to increase the inductance variation and provides a considerably more efficient circuit.

The casing 12 is provided with apertures or recesses as at 45 to permit access to the oscillator and antenna cores after they are placed in position within the metallic casing. In this manner, each of the stator cores may be moved longitudinally of the casing to permit adjustment of the mutual inductance between the stator and rotor windings to thereby obtain smoother tracking of the tuning units through the frequency range to be covered and compensate for variations in manufacture at the factory. After this adjustment has been effected, the stator cores are fixed in position within the casing by applying plastic cement 46 to provide a permanently tracked multi-gang tuning unit.

Connections to the coils are made through a terminal block 50 which is mounted within and secured to the casing 12. The connection block 50 is provided with terminal lugs 51 to which the respective leads from the oscillator tuning units are directly attached. The leads from the antenna tuning unit extend through longitudinal slots 52 in the shaft 13 and, thence, are connected to the associated lugs 51.

A stop member 60 is provided to limit the rotation of the shaft through an angle of approximately 180°. As shown by Figure 5, the member 60 is secured to the bushing 17 and has a protruding cam portion 61 which is adapted to engage a stop 62 fixed within the casing 12. It will be apparent that engagement of the respective ends of the protruding portions 61 with stop 62 limits the angular rotation of the control shaft 13.

In assembling the parts for the subject variometer, it should be noted that the casing 12 is composed of but two shells joined along a longitudinal axis so as to conveniently shield the operative and movable parts of the variometer in such fashion that the stator cores are held in place without the use of screws etc. The first step in assembling the parts of the variometer after the coils have been wound in a winding machine and placed on both the rotor cores and stator cores is to place the rotor cores 28 and 39 on the shaft 13. The next step is to place the stator cores 25 and 35 over the wound rotor cores 28 and 39, respectively, and then after bearings and supports therefor have been positioned at both ends of at least one half of the casing 12, the other half of the casing is then placed upon the first half so as to fully enclose the internal parts to form a complete variometer. The two half shelves 55 and 56 are conveniently held together by springs 57, 57'. It will be noted that by this construction of variometer parts and assembling thereof a compact variometer is obtained. A recess 45 is formed within the casing 12 so as to make it possible to move one or both of the stator cores with respect to the rotor cores by applying a convenient tool to the outside surface of either one of the stator cores to be moved. Since the stator cores are in slip-fit engagement with an internal surface of the casing 12 it is possible to adjust the respective stator cores longitudinally of the completed variometer. Electrical connections to the respective coils can be made after the end terminals thereof are brought out to the terminal lugs 51 within the terminal block 50.

A suitable superheterodyne circuit for use with the novel iron core variometer is shown in Figure 6. Referring to the figure, the signal from an antenna 70 is impressed upon the control grid of a converter tube 71. The antenna circuit is tuned to the signal frequencies by the variometer tuning unit 10 which has a variable condenser 72 in shunt therewith. The oscillator grid of the converter 71 is tuned by the variometer unit 11 which has a variable condenser 73 in shunt therewith. The heterodyned or beat signal appears in the plate circuit 74 of the converter and the output from the plate is passed through an intermediate frequency transformer 75 to the first intermediate frequency stage 76. As will be understood by those skilled in the art, the intermediate frequency signal may be passed through any desired number of intermediate frequency stages and then through a second detector tube to the audio-amplifier system of the receiver.

By the use of the novel ganged iron core variometer, smooth tracking of the antenna and oscillator circuits is obtained and the size of the set may be considerably reduced as a result of reduction in the size of the tuning circuits. In addition, the variometer is adjusted to secure accurate tracking merely by axial adjustment of the stator cores with respect to the associated rotor cores.

While the present invention, as to its objects and advantages, has been described herein as carried out in specific embodiments thereof, it is not desired to be limited thereby but it is intended to cover the invention broadly within the spirit and scope of the appended claims. Thus, for example, it will be apparent that a plurality of radio frequency tuning sections similar to tuning unit 10 may be provided and controlled by the shaft 13 in the event that it is desired to incorporate one or more tuned radio frequency stages in the receiver.

What is claimed as new and desired to be secured by Letters Patent is:

1. In an iron core variometer for a radio frequency tuning circuit, a cylindrical metal casing of two half shells joined along a longitudinal axis forming a slip-fit engaging connection, a hollow cylindrical stator core of pressed powdered magnetic material threadless adjustably mounted within said casing in direct contact therewith for quick alignment, a stator coil fixed to said core, a substantial part of said coil being wound upon the inner surface of said core whereby said core is at all times interposed between said part of the coil and said metal casing, a shaft journaled in said metal casing, a rotor core of pressed powdered magnetic material mounted on said shaft within said stator core, a rotor coil fixed to said rotor core, and means for rotating said shaft to thereby move the rotor coil with respect to the stator coil, said shaft being recessed for engagement with a ball engaging an annular resilient plate member mounted to said casing.

2. In an iron core variometer for a radio frequency tuning circuit, a cylindrical metal casing of two half shells joined along a longitudinal axis forming a slip-fit engaging connection, a hollow cylindrical stator core of pressed powdered magnetic material threadless adjustably mounted within said casing in direct contact therewith for quick alignment, a stator coil fixed to said core, a substantial part of said coil being wound upon the inner surface of said core whereby said core is at all times interposed between said part of the coil and said metal casing, a rotor core of pressed powdered magnetic material mounted within said stator core, a rotor coil fixed to said rotor core, and means for rotating said rotor coil with respect to said stator coil, said shaft being recessed for engaging an annular resilient plate member mounted to said casing.

3. In an iron core variometer for a radio frequency tuning circuit, a cylindrical metal casing of two half shells joined along a longitudinal axis forming a slip-fit engaging connection, a hollow cylindrical stator core of pressed powdered magnetic material threadless adjustably mounted within said casing in direct contact therewith for quick alignment, a stator coil fixed to said core, a substantial part of said coil being wound upon the inner surface of said core whereby said core is at all times interposed between said part of the coil and said metal shell, a rotor core of pressed powdered magnetic material mounted within said stator core, a rotor coil associated with said rotor core, and means for effecting relative movement between said stator coil and said rotor coil, said shaft being recessed for engaging an annular resilient plate member mounted to said casing.

4. In an iron core variometer for radio frequency tuning circuits, the combination comprising a two-part longitudinally divided casing, a shaft journaled in said casing, a first tuning unit and a second tuning unit; each of said units including a hollow stator core of pressed powdered magnetic material threadless adjustably mounted within said casing in direct contact therewith for quick alignment, a stator coil wound on said core, a rotor core of pressed powdered magnetic material mounted on said shaft, said shaft being recessed for engagement with a ball engaging an annular resilient plate member mounted to said casing and a rotor coil wound on said rotor core; and means for adjusting said tuning units so that the frequency of the first tuning circuit, throughout the tuning range, differs from that of the second tuning circuit by a substantially constant frequency.

WILLIAM F. FAGEN.

REFERENCES CITED

The following references are of record in the file of this patent:

UNITED STATES PATENTS

| Number | Name | Date |
|---|---|---|
| Re. 21,281 | Polydoroff | Nov. 28, 1939 |
| 2,037,754 | Beers | Apr. 21, 1936 |
| 2,143,298 | Boucke | Jan. 10, 1939 |
| 2,193,343 | Putnam | Mar. 12, 1940 |
| 2,270,178 | Weis | Jan. 13, 1942 |
| 2,323,376 | Harvey | July 6, 1943 |
| 2,338,134 | Sands | Jan. 4, 1944 |
| 2,343,999 | Putnam | Mar. 14, 1944 |
| 2,359,684 | Sands | Oct. 3, 1944 |
| 2,422,381 | White | June 17, 1947 |
| 2,422,995 | Vorie | June 24, 1947 |
| 2,433,898 | Gilman | Jan. 6, 1948 |